United States Patent
Paillet et al.

(10) Patent No.: US 12,470,540 B2
(45) Date of Patent: Nov. 11, 2025

(54) CENTRALIZED CERTIFICATE MANAGEMENT FOR CERTIFICATE PINNING

(71) Applicant: Schneider Electric USA, Inc., Andover, MA (US)

(72) Inventors: Daniel Andre Paillet, Andover, MA (US); Michael William Pyle, Hermitage, TN (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 18/597,430

(22) Filed: Mar. 6, 2024

(65) Prior Publication Data
US 2025/0286879 A1    Sep. 11, 2025

(51) Int. Cl.
*H04L 9/40*    (2022.01)

(52) U.S. Cl.
CPC ...... *H04L 63/0823* (2013.01); *H04L 63/0884* (2013.01)

(58) Field of Classification Search
CPC .......... H04L 63/0823; H04L 63/0884
See application file for complete search history.

(56) References Cited

U.S. PATENT DOCUMENTS

| | | | |
|---|---|---|---|
| 10,305,903 B2 | 5/2019 | Bronshtein et al. | |
| 2011/0004753 A1* | 1/2011 | Gomi | H04L 63/0807 713/175 |
| 2011/0185171 A1* | 7/2011 | Karasawa | H04W 12/069 713/156 |

* cited by examiner

*Primary Examiner* — Huan V Doan
(74) *Attorney, Agent, or Firm* — Quinn IP Law (57) ABSTRACT

A method is provided for storing a proxy site certificate and up-to-date cloud site certificates for cloud site(s), receiving a request from a client application executing on a client device to access one or more of the cloud site(s), the client device being a computing device, authenticating with the client application using the proxy site certificate and based on the proxy site certificate being pinned to the client application, requesting a secure connection with the cloud site(s) on behalf of the client application, receiving, in response to the request, a site certificate for each of the cloud site(s), authorizing with the cloud site(s) on behalf of the client application using the received site certificate for each of the cloud site(s) and the certificate data stored for each of the respective cloud site(s), and facilitating direct communication between the client application and the cloud site(s) that were successfully authorized.

19 Claims, 8 Drawing Sheets

602 Generate, on the condition that the authentication with the client application is successful, a token corresponding to each respective authorized cloud site of the one or more cloud sites for which authorization with the cloud site was successful on the condition that the authentication with the client application is successful 604 Provide the token generated to each respective authorized cloud site 606 Provide the token(s) that were provided to each respective authorized cloud site to the client application in association with the corresponding cloud site, wherein the direct communication between the client application and each of the authorized cloud sites is established by a determination by the client application and the each of the authorized cloud sites that the token provided to the client application in association with the authorized cloud site matches the token that corresponds to the authorized cloud site

802 Receive a first token from the proxy service in association with each authorized cloud-based service 804 Submit the first token associated with each of the authorized cloud-based services to the corresponding authorized cloud-based service for verification of the first token by the authorized cloud-based service using a second token that corresponds to the authorized cloud-based service, wherein the second token was provided to the authorized cloud-based service by the proxy service once the authorized cloud-based service was authorized by the proxy service 806 Receive from each of the authorized cloud-based services a second token that corresponds to the authorized cloud-based service 808 Verify each second token for authorizing direct communication with the corresponding authorized cloud-based service based on a match between the second token and the first token associated with the authorized cloud-based service, wherein the direct communication is established with each authorized cloud-based service that verified the first token it received based on a match with its second token

CENTRALIZED CERTIFICATE MANAGEMENT FOR CERTIFICATE PINNING

TECHNICAL FIELD

The present disclosure relates to authenticating client-cloud connections over TLS protocols, and more particularly, to centralized certificate manage for certificate pinning for a client device.

BACKGROUND

Certificate pinning provides the client application or client device with a preconfigured list of certificates (e.g., TLS or SSL certificates or the equivalent) or public keys that it explicitly trusts. These certificates of public keys can be provided out-of-band. Certificate pinning is used in the context of authenticating client-cloud connections over TLS protocols for ensuring that the client only communicates with a trusted cloud. Pinning obviates the need to rely on a certificate authority (CA) system. The terms "pinning" or "certificate pinning" (used interchangeably throughout the disclosure) are generally used to refer to the pinning of certificates, keys, or hashed certificates or keys (unless explicitly stated otherwise). Certificate pinning can be used as a security mechanism to promote secured communication by a client device's application with a cloud site over transport layer security (TLS) protocols. A primary objective of pinning is to mitigate risk of man-in-the-middle (MITM) attacks.

The development and use of client applications for smart devices is on the rise, such that most client devices use multiple applications, each of which has its own pinned certificate(s) or key(s). Maintenance of pinned certificates for each application can become unwieldly, such as due to the need to individually manage renewal of each certificate before it expires and a potential risk of loss of connectivity with the cloud site (e.g., when the cloud undergoes an upgrade or rotates its keys). As the number of client applications per client device increases, the complexity and risk associated with managing the pinned certificates increases. Although the availability and need for client devices to use more client applications is increasing, maintenance of pinned certificates interferes with scalability of client applications.

Conventional methods and systems for securing communication between a client application with a cloud over TLS protocols have been considered satisfactory for their intended purpose. However, there is still a need in the art to simplify management by a client device of its pinning certificates.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a proxy device having a memory configured to store a plurality of programmable instructions and a processing device in communication with the memory, wherein the processing device, upon execution of the plurality of programmable instructions is configured to perform a method. The method includes storing a proxy site certificate and up-to-date cloud site certificates for each of at least one cloud-based cloud sites, receiving a request from a client application executing on a client device to access one or more cloud sites of the at least one cloud sites, the client device being a computing device, authenticating with the client application using the proxy site certificate and based on the proxy site certificate being pinned to the client application. The method further includes requesting a secure connection with the one or more cloud sites on behalf of the client application, receiving, in response to the request, a site certificate for each of the one or more cloud sites, authorizing with the one or more cloud sites on behalf of the client application using the received site certificate for each of the one or more cloud sites and the certificate data stored for each of the respective one or more cloud sites, and facilitating direct communication between the client application and the one or more cloud sites that were successfully authorized.

In one or more embodiments, facilitating the communication includes generating a token on the condition that the authorization with the client application is successful, providing the token to each authorized cloud sites of the one or more cloud sites for which authorization with the cloud sites was successful, and providing the token to the client application, wherein the direct communication between the client application and each of the authorized cloud sites is established by a determination by the client application and the each of the authorized cloud sites that the token provided to the client application matches the token provided to the authorized cloud site.

In one or more embodiments, facilitating the communication includes generating, on the condition that the authentication with the client application is successful, a token corresponding to each respective authorized cloud sites of the one or more cloud sites for which authorization with the cloud sites was successful on the condition that the authentication with the client application is successful, providing the token generated to each respective authorized cloud site, and providing the token(s) provided to each respective authorized cloud site to the client application in association with the corresponding cloud site, wherein the direct communication between the client application and each of the authorized cloud sites is established by a determination by the client application and the each of the authorized cloud sites that the token provided to the client application in association with the authorized cloud site matches the token that corresponds to the authorized cloud site.

In one or more embodiments, a subset of the tokens corresponding to each of the authorized cloud sites are different from each other.

In one or more embodiments, all the tokens corresponding to each of the authorized cloud sites are the same.

In one or more embodiments, the client device is a mobile device.

In one or more embodiments, the proxy includes a frontend and a backend, the frontend being configured to communicate with the client device and the backend, store the proxy site certificate, receive the request from the client application, and authenticate with the client application. The backend is configured to communicate with the plurality of cloud sites and the frontend, authenticate with the client, request a secure connection with the one or more cloud sites, receive the site certificate for each of the one or more cloud sites, authorize with the one or more cloud sites, and facilitate the direct communication between the client application and the one or more cloud sites that were successfully authorized.

In one or more embodiments, the frontend is remote from the backend.

In one or more embodiments, the frontend is local to the backend.

In accordance with a further aspect of the disclosure, a client device configured to execute a client application is provided. The client device includes a memory configured to store a plurality of programmable instructions associated with the client application and a processing device in communication with the memory. The processing device, upon execution of the plurality of programmable instructions is configured to perform a method. The method performed by the client device's processing device includes sending a request to a proxy service executing on a proxy device for access to one or more cloud-based cloud sites, authenticating with the proxy service using proxy site certificate data previously pinned to the client application, and establishing direct authorized communication with each of the one or more cloud sites that was authorized by the proxy service and for which the direct communication was facilitated by the proxy service, wherein each authorized cloud site was authorized based on the token using up-to-date proxy certification data accessible to the proxy service and a site certificate provided by each of the authorized cloud-based services.

In one or more embodiments, establishing direct communication includes receiving a first token from the proxy service in association with each authorized cloud-based service and submitting the first token associated with each of the authorized cloud-based services to the corresponding authorized cloud-based service for verification of the first token by the authorized cloud-based service using a second token that corresponds to the authorized cloud-based service, wherein the second token was provided to the authorized cloud-based service by the proxy service once the authorized cloud-based service was authorized by the proxy service. Establishing direct communication further includes receiving from each of the authorized cloud-based services a second token that corresponds to the authorized cloud-based service and verifying each second token for authorizing direct communication with the corresponding authorized cloud-based service based on a match between the second token and the first token associated with the authorized cloud-based service, wherein the direct communication is established with each authorized cloud-based service that verified the first token it received based on a match with its second token.

In one or more embodiments, the second tokens corresponding to a subset of the authorized cloud sites are different from each other and the first tokens received from the proxy service in association with the subset of authorized cloud-based service(s) are different from each other.

In one or more embodiments, all the second tokens corresponding to each of the authorized cloud sites are the same and all the first tokens received from the proxy service in association with each of the authorized cloud sites are the same.

In one or more embodiments, the client device is a mobile device.

In accordance with another aspect of the disclosure, the method performed by the processing device of the proxy device is provided.

In accordance with another aspect of the disclosure, the method performed by the processing device of the client device is provided.

In accordance with still a further aspect of the disclosure, a non-transitory computer readable storage medium and one or more computer programs embedded therein is provided, which when executed by a computer system, cause the computer system to perform the method disclosed as being performed by the processing device of the proxy device.

In accordance with still a further aspect of the disclosure, a non-transitory computer readable storage medium and one or more computer programs embedded therein is provided, which when executed by a computer system, cause the computer system to perform the method disclosed as being performed by the processing device of the client device.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Disclosed is a system and method that provides a proxy device to provide centralized certificate management for certificate pinning for secure communication between client devices and cloud sites. A client device pins a certificate or the like (e.g., a public key or a hash of the public key) for the proxy device. The client device can use a plurality of applications (client apps). Each client app can be configured to communicate with a different cloud site. Communication with the cloud sites can be via a third party cloud site. The client device is responsible for managing only this single pinned certificate or the like. The proxy device pins and manages certificates or the like for a plurality of cloud sites.

When a client app of the client device seeks to communicate with one of the cloud sites (including via its third part cloud site), the client app submits a communication request to the proxy device. The proxy device authenticates the client app that submitted the communication request. Upon authentication of the client app, the proxy device authorizes a token that is generated by the proxy device. The proxy device submits the authorized token to the cloud site with which communication was requested and to the client app. The client app can communicate directly with the cloud site using the authorized token.

Figure 1:
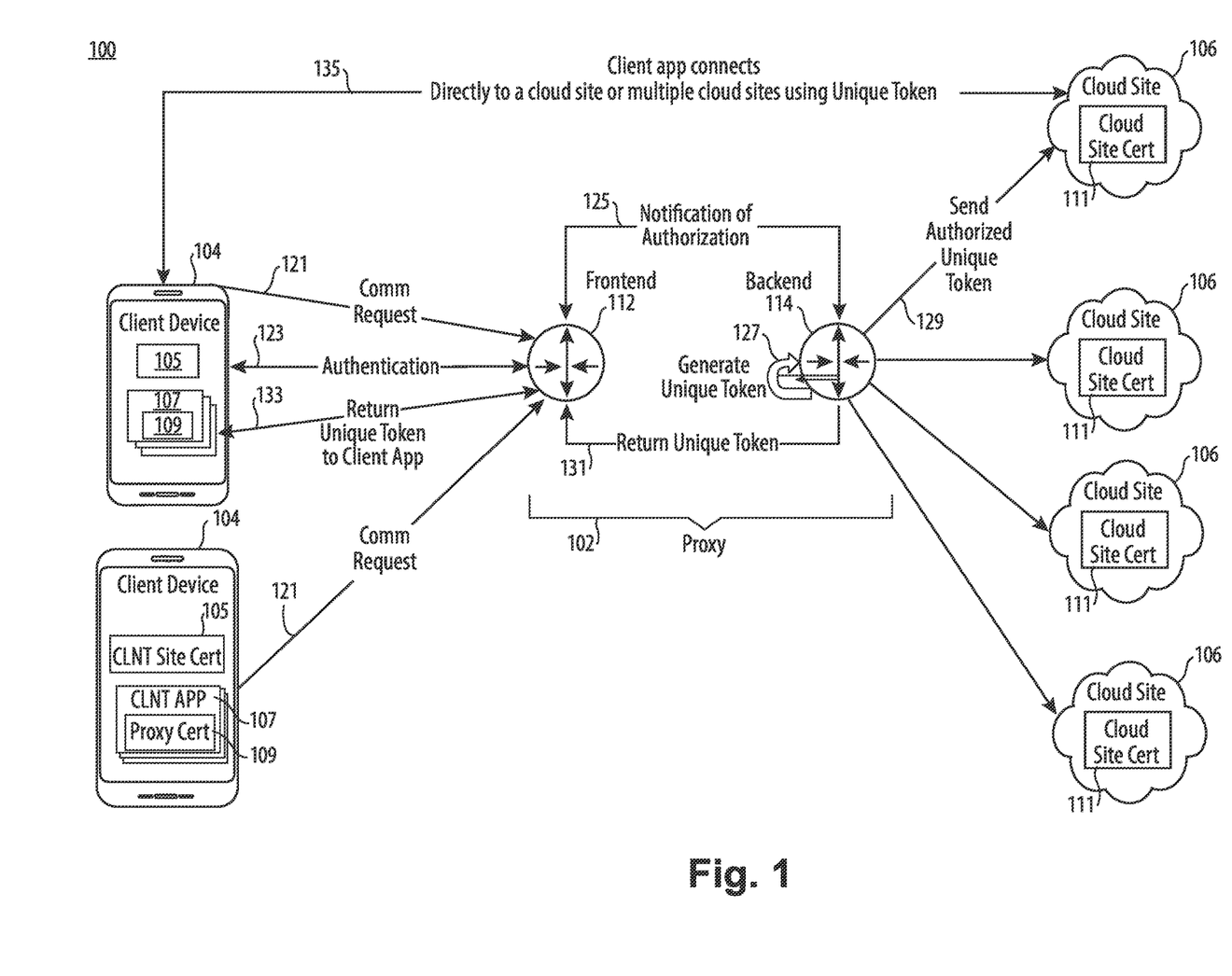
FIG. 1 is a block diagram illustrating an example system for centrally managing pinning of certificates for cloud sites used by client applications installed on client devices, in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a certificate pinning management system in accordance with the disclosure is shown in FIG. 1 and is designated generally by reference character 100. Other embodiments of certificate pinning management system 100 in accordance with the disclosure, or aspects thereof, are provided in FIGS. 2-9, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a memory storage device or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Certificate management system 100 includes a proxy device 102 that can receive and process communication requests 121 from a client app of one or more client devices 104 to establish communication between the client app and a requested cloud site 106 of a plurality of candidate cloud sites 106. Proxy 102 includes a frontend 112 that communicates with one or more client devices 104 and a backend 114 that communicates with the candidate cloud sites 106. Frontend 112 and backend 114 communicate with one another.

Client device(s) 104 are computing devices that can be mobile or stationary devices that each have one or more installed client apps 107 that, when executed, communicate with a cloud site 106 of the candidate cloud sites 106. In accordance with certain embodiments, some examples of client devices 104 include computing devices that operate in an operational technology (OT) environment and/or are included in an industrial system and/or the Industrial Internet of Things (IIoT), such as industrial control devices (e.g., programmable logic controllers (PLCs), edge devices, microcontrollers, etc.), smart industrial field devices (e.g., actuators, sensors, alarms), industrial supervisory controllers (e.g., supervisory control and data acquisition (SCADA) systems and industrial remote control systems (mobile phones, tablets, laptop computers, desktop computers, minicomputers, or mainframe computers). In accordance with certain embodiments, some examples of client device(s) 104 include computing devices that operate in an information technology (IT) environment and/or are included in an individual user, residential, or enterprise system and/or the IoT, such as smart appliances, mobile phones, tablets, laptop computers, desktop computers, minicomputers, or mainframe computers.

The client apps 107, when executed by the client device 104 upon which they are installed (also referred to as a host client device 104), provide functionality to the host client device 104 by communicating with cloud sites 106 via secure communication, such as for requesting a service from a cloud site 106, monitoring, performing a task, tracking information, interfacing with components of and/or data stored by client device 104 and/or interfacing with another device, etc. In certain embodiments, the client app installed on a client device 104 is a mobile application and the client device 104 is a mobile device or any computing device acting as a client.

The secure communication can use secure communication protocols, such as Transport Layer Security (TLS) or Secure Sockets Layer (SSL). Referring to TLS protocol as an example of secure communication protocols, without limitation to a particular secure communication protocol, TLS handshaking is performed between a client app and a cloud site 106 to establish secure communication.

In a typical TLS handshake, when a client connects to a cloud site, the cloud site presents its digital certificate to the client. The certificate's authenticity can be verified by determining that the certificate was signed by a trusted Certificate Authority (CA) and that the signed certificate has not expired or been revoked. Secure communication between the client app and the cloud site 106 is enabled contingent upon a successful handshake, including verification of the signed certificate.

In certain embodiments, cloud sites 106 include cloud sites, such as web cloud sites disposed in a cloud that communicate with the client apps and/or provide services to client apps. The term "cloud" as used with reference to cloud sites 106 refers to remote computer system resources that are available on-demand to clients, such as client devices 104 for the purpose of cloud computing. The cloud sites 106 can be accessed via public networks, such as the Network, or private networks. Cloud computing, as defined by United States National Institute of Standards and Technology (NIST) at Mell et al., (September 2011). The NIST Definition of Cloud Computing (Technical report). National Institute of Standards and Technology: U.S. Department of Commerce. Doi: 10.6028/NIST.SP.800-145. Special publication 800-145.

Cloud sites 106 are configured to perform handshaking for establishing secure communication, including providing a signed certificate when communication is requested by a client app. The cloud site 106 is further configured to handle communication tasks, which may include certificate signing, communication requests, authentication of requesting client apps, and/or submission of the signed cloud site certificate 111 to requesting client apps. Cloud site 106, as shown in FIG. 1, represents the hardware and software that is configured to perform these communication tasks, whether handled by a third party or the web cloud site that is requested to communicate with the requesting client app 107. Cloud site 106 can be a single integrated entity that is a web cloud site that performs these communication tasks, or can include a web cloud site that communicates with the client app once secure communication is established coupled with a remote cloud site that handles one or more of the communication tasks.

Implementation of traditional secure communication that does not use the disclosed method for centralized certificate management includes a client app initiating a secure handshake, such as a TLS handshake, with a cloud site. The cloud site presents its digital certificate to the client app, and the client app verifies the certificate to assure it is properly signed by a trusted CA, and has not been expired or been revoked, following which the secure communication can be established. However, to promote greater security, in particular to evade man-in-the-middle (MITM) attacks, client apps can implement certificate pinning. When certificate pinning is used, the client app or hosting client device are preconfigured to store a list of public keys or certificates that are trusted for any cloud sites with which secure communication is to be detected.

While pinning increases security, implementation of pinning introduces a number of challenges. One challenge is a result of these certificates held by cloud sites with which a client app or client device communicates having different expiration dates or being revoked at different times. Each time a cloud site's certificate expires or is revoked, there is a need for a developer to update deployment corresponding of a certificate pin (also referred to as a pin) on the host client device.

There has been an enormous upsurge in the development and use of client apps in client devices, most commonly mobile devices. This increase has been adopted in various environments, including commercial environments, industrial environments, IT environments, and personal-use environments. Some client apps rely on access to multiple different cloud sites that can be deployed on one or more clouds within an enterprise to which it belongs and possibly third-party cloud sites deployed on clouds that are remote from the enterprise. The need to update deployment of pins for a large number of cloud sites deployed on different clouds within and without an enterprise can present architectural complications and dependencies, all of which can impact development and maintenance of the client apps. Management of the pinned certificates can become unwieldy and can undermine benefits of certificate pinning itself. When pin management is not coordinated with cloud site updates, service outages can occur. Furthermore, challenges associated with managing pins can interfere with scalability of client apps and services provided by cloud sites.

Cloud site certificates 111 can be secure certificates (e.g., TLS or SSL certificates), a public key for the corresponding cloud site 106 or a hashed certificate or public key. In addition, the description related to pinning is also intended to encompass stapling, in which online certificate status protocol (OCSP) responder information is provided with a signed cloud site certificate 111 in response to a request secure communication request, and the OCSP responder information is verified with the signed cloud site certificate 111.

Proxy 102 is configured to provide central management of cloud site certificate pinning, which allows client apps 107 installed on client devices 104 to manage only pinning of a certificate of proxy 102 (referred to as proxy site certificate 109). Proxy site certificate 109 can include a secure (e.g., TSL or SSL) certificate, a public key, a hashed certificate, or a hashed public key. In addition, each application requiring SSL pinning on the client device 104 stores its own client (CLNT) site certificate 105 which it provides to proxy 102 during an authentication process in which proxy 102 authenticates the client device 104.

Proxy 102 centrally manages pinning of certificates for the plurality of candidate cloud sites 106 (referred to as cloud site certificates 303 (see FIG. 3)). The centralized management of pinning of cloud site certificates reduces or eliminates duplication of management of pinning cloud site certificates by multiple client devices 104 and reduces or minimizes management of pinning of cloud site certificates by multiple client apps 107 on a single client device 104 or installed on multiple client devices 104. Instead, each client device 104 or client app 107 is responsible for managing pinning of a single proxy site certificate 109 for each proxy 102 that it uses for managing pinning of cloud site certificates of cloud sites 106 with which it intends to potentially communicate.

In certain embodiments, multiple proxies 102 can be provided. Management of pinning of certificate by the multiple proxies 102 can be divided in a number of ways, such as by assigning a particular proxy to particular client apps 107. This still centralizes management of pinning cloud site certificates and reduces the amount of management of pinning of certificates pins that needs to be performed by client apps 107.

Figures 2, 3:
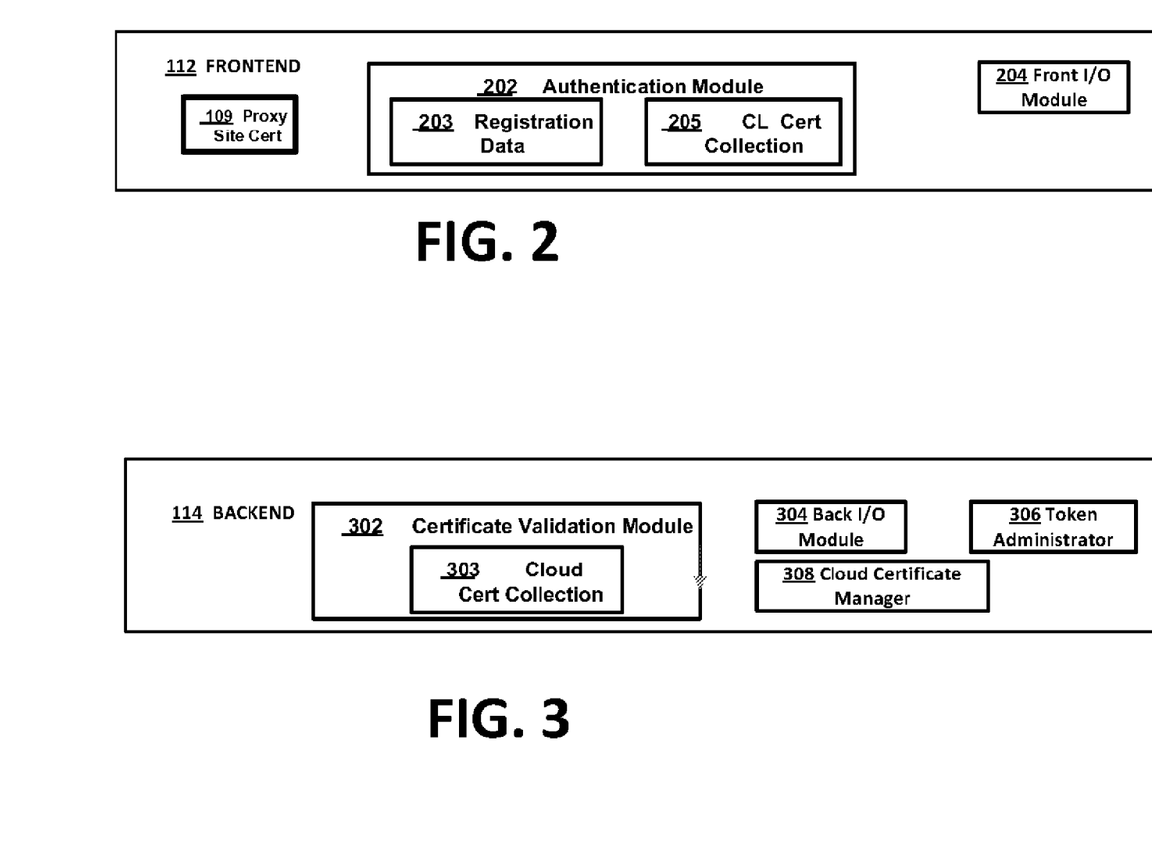
FIG. 2 is a block diagram illustrating an example frontend of a proxy used for centralized management of pinning certificates for cloud sites used by client applications installed on client devices and in communication with the client devices, in accordance with embodiments of the disclosure.
FIG. 3 is a block diagram illustrating an example backend of a proxy used for centralized management of pinning certificates for cloud sites used by client applications installed on client devices and in communication with the cloud sites, in accordance with embodiments of the disclosure.

With further reference to FIG. 2, frontend 112 is shown in further detail. Frontend 112 includes an authentication module 202 and a front I/O module 204. Authentication module 202 includes any software and/or hardware configured to handle tasks associated with managing pinning of client certificates 105 for one or more client apps 107 and authenticating client apps 107. Front I/O module 204 includes software and/or hardware configured to communicate with client apps 107 and backend 114. In addition, proxy 102 stores its own proxy site certificate 109.

Client apps 107, and/or their users are previously registered with authentication module 202. During a registration process, authentication module 202 communicates with a client app 107, and/or the user to obtain and cause to be stored registration data 203 associated with registration of the client app 107, and/or user that is subscribed to use a service provided by one or more of cloud sites 106. The subscription for the service can be obtained prior to or during the registration process. In a scenario in which the subscription is obtained during the registration process, the registration process can be interactive with both the corresponding cloud site 106 in addition to the client app 107, and/or user. The registration data can include verification data and subscription data. The verification data can include, for example, a username and password associated with the client app 107, and/or user that has the subscription to use the service.

The subscription can be a paid or non-paid subscription, and provides the client app 107, and/or user with permission to use the service. The subscription data can identify the subscription to the corresponding cloud site(s) 106. In certain embodiments, the subscription data can further include sufficient information that can be passed by proxy 102 to the corresponding cloud site(s) 106 to provide the requested service to the requesting client app 107. For example, the subscription data can include identification of the requesting client app 107, and can further identify, if needed, the particular service to be provided by the corresponding cloud site(s) 106. When authenticating a client app 107, and/or user, authentication module 202 can access the registration data 203 that corresponds to that client app 107, and/or user.

In addition, during the registration process, a client certificate 109 is pinned in a client certificate collection 205. When authenticating a client app 107, authentication module 202 can access the client certificate 109 pinned in the client certificate collection 205.

With further reference to FIG. 3, backend 114 is shown in further detail. Backend 114 includes a certificate validation module 302, a back I/O module 304, a token administrator 306, and a cloud certificate manager 308. Certificate validation module 302 includes a cloud certificate collection 303. Cloud certificates 111 for the candidate cloud sites 106 are pinned in cloud site certificate collection 303. Cloud certificate manager 308 is configured with hardware and/or software to perform tasks for updating the cloud site certificates 111 pinned in cloud certificate collection 303 is performed by cloud certificate manager 308. Cloud certificate manager 308 can check the status of the cloud certificates 111 periodically or in response to an event and can automatically update a cloud certificates 111 that has expired or been revoked and/or can transmit an alert to an administrator to perform or check on the update. Back I/O module 304 includes software and/or hardware configured to communicate with cloud sites 106 and frontend 112. Token administrator 306 includes any software and/or hardware configured to generate and authorize tokens.

Figure 4:
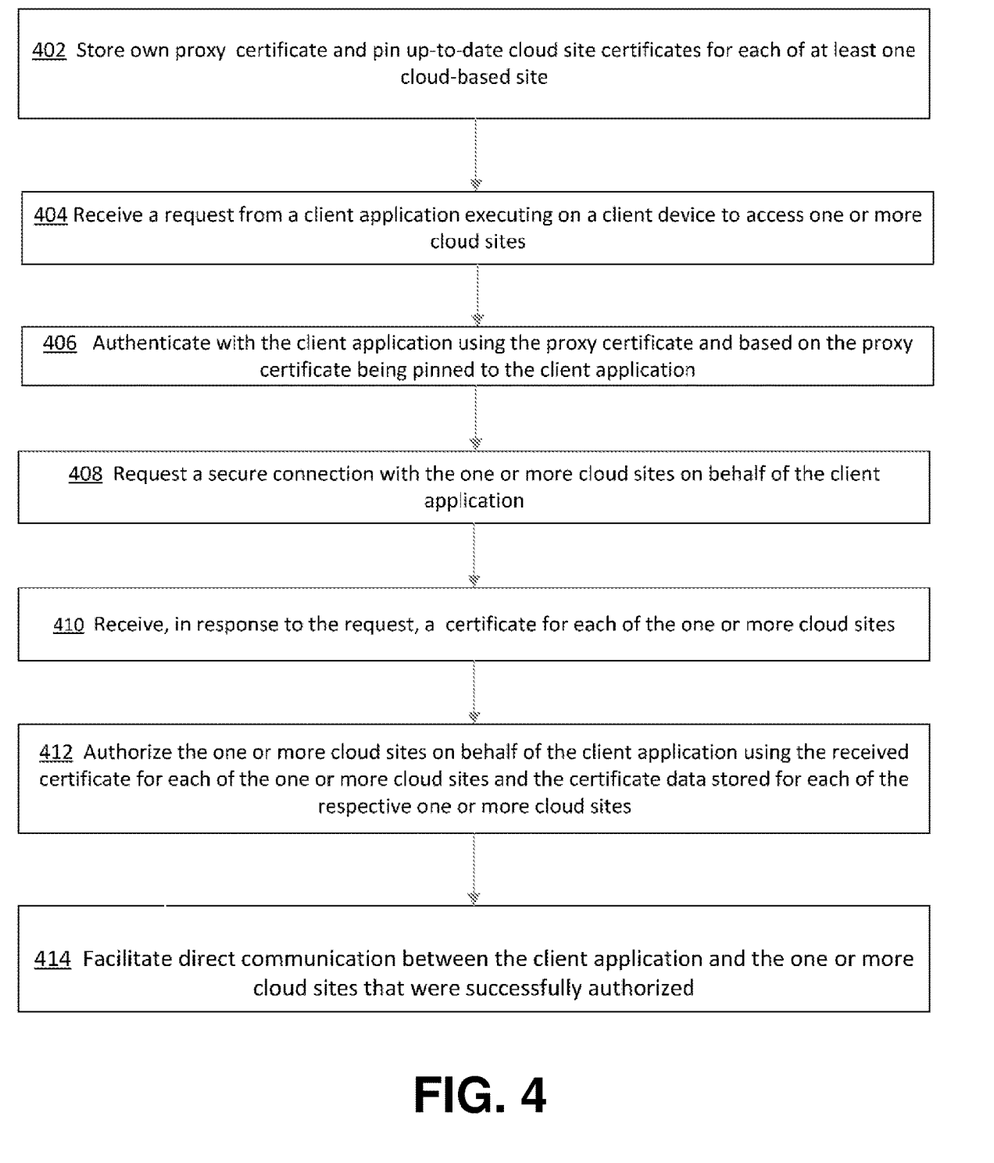
FIG. 4 is a flowchart representing an example method implemented by a proxy that is used for centralized management of pinning certificates for cloud sites used by client applications installed on client devices, in accordance with embodiments of the disclosure.

With reference now to FIGS. 1 and 4, FIG. 1 shows a flow diagram and FIG. 4 shows a flowchart. The flow diagram and flowchart demonstrate implementation of the various exemplary embodiments. It is noted that the order of operations shown in FIGS. 1 and 4 is not required, so in principle, the various operations may be performed out of the illustrated order. Also, certain operations may be skipped, different operations may be added or substituted, some operations may be performed in parallel instead of strictly sequentially, or selected operations or groups of operations may be performed in a separate application following the embodiments described herein.

With reference to FIGS. 1-3, an example method performed by certificate management system 100 using an example flow of operations is shown. The method begins with transmission of a communication (Comm) request by a client app 107 of a particular client device 102 to frontend 112. The communication request requests provision of a service by an identified cloud site 106 to a client app 107 installed on a client device (also referred to as the requesting client app 107) that is operated by a user. More than one cloud site 106 can be identified. The description about the flows shown in the flow diagram of FIG. 1 apply as well to a situation in which more than one cloud site 106 is identified. The provision of service requires communication between the requesting client app 107 and the identified cloud site 106. The cloud site 106 can be identified, for example, by using its address (e.g., uniform resource locator (URL) or IP address).

At flow 123 an authentication process is performed to authenticate, for provision of the service to the requesting client app 107, and/or the user. During a first part of the authentication process, the requesting client app 107 validates a certificate provided by proxy 102 using its pinned proxy cert 109. In addition, proxy 102 validates the client certificate 105 provided by the requesting client app 107 using the corresponding client certificate pinned to client certificate collection 205. These validations by both the requesting client app 107 and proxy 102 need to succeed in order for the first part of the authentication process to be successful.

During a second part of the authentication process, proxy login data (e.g., username and password and/or biometric data) is provided to authentication module 202. Authentication module 202 can request or prompt the user (via the requesting client app 107) to provide the proxy login data. The proxy login data is used to authenticate the user of the requesting client app 107 with proxy 102. Authentication module 202 can further use multi-factor authentication (e.g., using a one-time code)) to verify the proxy login data. Authentication module 202 can further access the registration authentication data and compare it to the proxy login data. Authentication can be completed based on a result of the comparison. The second portion of the authentication is successful when the proxy login data matches corresponding data of the registration authentication data, otherwise authentication fails. If the second part of the authentication process is successful, the corresponding subscription data is determined to be verified. If either part (first or second) of the authentication process fails, the request for communication can be denied.

The authentication process can further include authentication module 202 receiving cloud login data (e.g., username and password and/or biometric data) from the user. Authentication module 202 can request or prompt the user (via the requesting client app 107) to provide the cloud login data. The cloud login data is used to authenticate the user of the requesting client app 107 with the identified cloud site 106. The cloud login data can be provided to the identified cloud site 106 for verification by the identified cloud site 106.

When the authentication process is successful, the method continues at flow 125, in which authentication module 202 provides notification of authorization of the requesting app 107 to backend 114 via front I/O module 204 of frontend 112 and back I/O module 304 of backend 114. This notification of authorization represents authorization of the communication request and instructs backend 114 to provide a unique token for the communication request based on the verified subscription.

In one or more embodiments, authentication module 202 can access the subscription data that is associated with the user authentication data. The subscription data can be provided with the notification of authorization at flow 125. This disclosure does not restrict the amount of information included with subscription data. The information needed by cloud site 106 to provide a service to requesting client 107 can be provided by the subscription data or during exchange of information at flow 135, or a combination thereof.

At flow 127, token administrator 306 generates a unique token. Flow 127 can be performed before or after receipt of the verified subscription data via flow 125. Token administrator 306 can generate a plurality of unique tokens and one unique token can be selected for the communication request. The unique token is unique for the authorized communication request.

Based on and/or responsive to receipt of the verified subscription data via flow 125, backend 114 authorizes the unique token that was generated or selected responsive to receipt of the verified subscription data. In certain embodiments, backend 114 can add the verified subscription data to the unique token. Since the authorized token is unique and is only used for the particular communication request and the combination of the requesting client app 107 and the identified cloud site 106, this can obviate a need to identify either of the requesting client app 107 or the identified cloud site 106. At flow 129, backend 114 requests a secure connection with the identified cloud site 106 and authenticates the identified cloud site 106 on behalf of the requesting client application 107. Authentication of the identified cloud site 106 includes receiving in response to the request a cloud site certificate 111 for the identified cloud site 106 and using the cloud cite certificate pinned in cloud site certificate collection 303 to authenticate the cloud site 106 on behalf of the requesting client app 107.

At flow 129, contingent upon successful authentication of the identified cloud site 106, backend 114, via back I/O module 304, sends the authorized token to the identified cloud site 106. In certain embodiments, the authorized token can expire based on a condition, such as passage of a predetermined time interval without any communication from the requesting client app 107.

The authorized token notifies the cloud site 106 that received the authorized token that the cloud site 106 is authorized to communicate with a requesting client app 107 that can present a matching token. In one or more embodiments, if the authorized token includes subscription data that identifies or can be used to identify the requesting client app 107, the authorized token authorizes the cloud site 106 that received the token to communicate with the identified requesting client app 107. In one or more embodiments, the authorized token can include the cloud login data that was provided by the user to proxy 102. The identified cloud site 106 can verify the cloud login data in order to allow communication with the requesting client app 127 at flow 135.

At flow 131, backend 114 provides the unique token to front end 112 via back I/O module 304 and front I/O module 204. This is the same unique token that was authorized and provided to the identified cloud site 106. At flow 133 front end 112, via front I/O module 204, returns the unique token that was generated to the requesting client app 107.

At flow 135 the requesting client app 107 communicates directly with the identified cloud site 106 by using the unique token. The communication can be initiated by the requesting client app 107 providing a token message with the unique token to the identified cloud site 106 at its location, using the address of the identified cloud site 106. The identified cloud site 106 can receive the token message and compare the unique token to one or more unique tokens the cloud site 106 received from backend 114. If one of the unique tokens matches the unique token received in the token message from the requesting client device 104, the cloud site 106 and client device 104 can engage in bilateral communication that is secure. Cloud site 106 can provide services per the subscription data added to the authorized unique token, or per subscription data associated with the client app 107 found by a lookup procedure using, for example, the source address and/or client app identification included in the token message.

Cloud site 106's provision of services can be contingent upon cloud site 106 verifying the cloud login data. Cloud site 106 can further use multi-factor authentication with the requesting client app 107 to further verify the cloud login data. Alternatively, the user's provision of cloud login data, verification of the cloud login data, and any multi-factor verification can all take place during the communication that takes place between the requesting client app 107 and the identified cloud site 106 at flow 135.

It is noted that cloud sites 106 can receive multiple unique tokens from backend 114. Each unique token is unique for a particular communication request from a particular client app 107. When a cloud site 106 receives a communication via flow 135 it can continue the communication contingent upon its own determination that it has a matching token. The client app 107 can verify the cloud site 106's matching token and continue communication contingent upon client app 107's verification of the cloud site 106's matching token.

The communication at flow 135 can further include determining by cloud site 106 the identity of the client app 107 and/or the user, to which services the client app 107 and user have subscribed, including when the token does not include the subscription data.

FIG. 4, shows a flowchart 400 that represents a method performed by a proxy, such as proxy 102 shown in FIG. 1, for providing centralized management of pinned certificates, At block 402, the proxy stores its own proxy site certificate (such as a proxy site certificate 109, shown in FIG. 2) and pins up-to-date cloud site certificates for each of at least one cloud site (such as the cloud site certificates pinned in cloud site certificate collection 303, shown in FIG. 3). At block 404, the proxy receives a request from a client application (such as a client application 107 shown in FIG. 1) executing on a client device (such as client device 104, shown in FIG. 1) to access one or more cloud sites of the at least one cloud site (such as cloud sites 106, shown in FIG. 1), the client device being a computing device.

At block 406, the proxy authenticates with the client application using the proxy site certificate and based on the proxy site certificate being pinned to the client application. At block 408, the proxy requests a secure connection with the one or more cloud sites on behalf of the client application. At block 410, the proxy receives, in response to the request, a site certificate for each of the one or more cloud sites. At block 412, the proxy authorizes the one or more cloud sites on behalf of the client application using the received site certificate for each of the one or more cloud sites and the certificate data stored for each of the respective one or more cloud sites. At block 414, the proxy facilitates direct communication between the client application and the one or more cloud sites that were successfully authorized.

Figure 5:
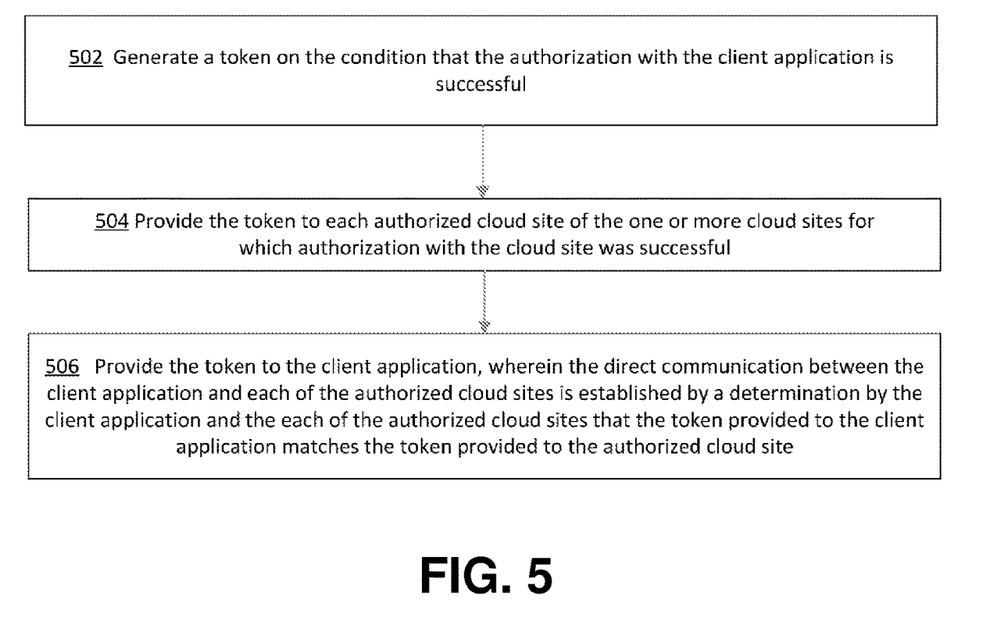
FIGS. 5 and 6 are flowcharts representing different example methods, in accordance with certain embodiments, for performing facilitation of secure communication included in the example method represented by the flowchart in FIG. 4.

FIG. 5 shows, in accordance with certain embodiments, a flowchart 500 that represents a method of performing block 414 of FIG. 4. In these embodiment(s), one token is used by the client application for all the one or more cloud sites. At block 502, the proxy generates a token on the condition that the authorization with the client application is successful. At block 504, the proxy provides the token to each authorized cloud site of the one or more cloud sites for which authorization with the cloud site was successful. At block 506, the proxy provides the token to the client application, wherein the direct communication between the client application and each of the authorized cloud sites is established by a determination by the client application and the each of the authorized cloud sites that the token provided to the client application matches the token provided to the authorized cloud site.

Figure 6:
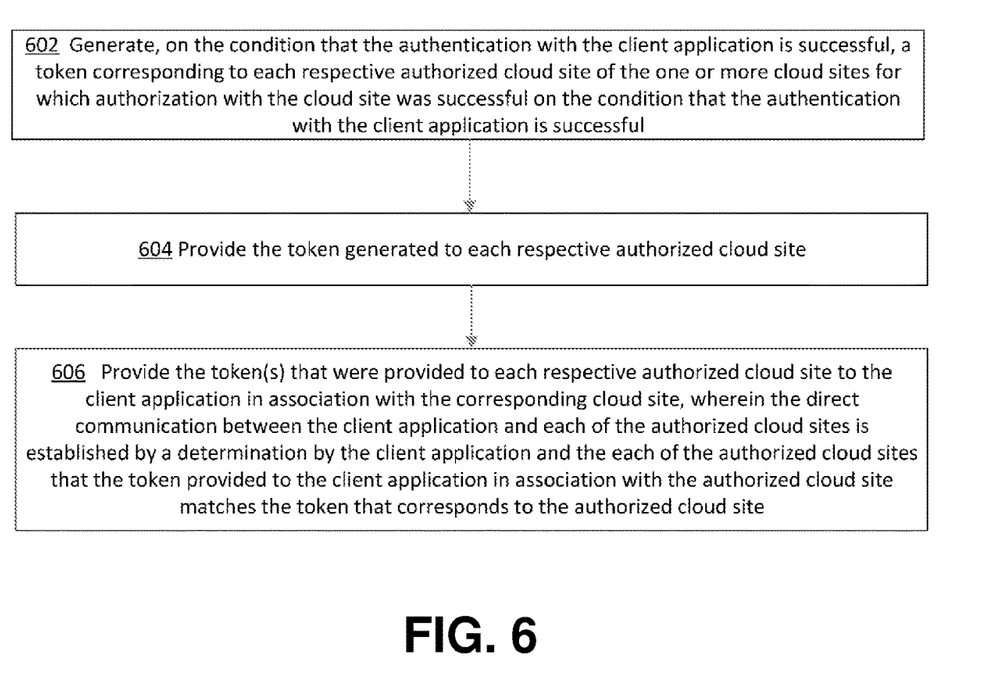

FIG. 6 shows, in accordance with certain embodiments, a flowchart 600 that represents a method of performing block 414 of FIG. 4. In these embodiment(s), multiple tokens are used for the respective one or more cloud sites. At block 602, the proxy generates, on the condition that the authentication with the client application is successful, a token corresponding to each respective authorized cloud site of the one or more cloud sites for which authorization with the cloud site was successful on the condition that the authentication with the client application is successful. At block 604, the proxy provides the token generated to each respective authorized cloud site. At block 606, the proxy provides the token(s) that were provided to each respective authorized cloud site to the client application in association with the corresponding cloud site, wherein the direct communication between the client application and each of the authorized cloud sites is established by a determination by the client application and the each of the authorized cloud sites that the token provided to the client application in association with the authorized cloud site matches the token that corresponds to the authorized cloud site. In certain embodiments, a subset of the tokens corresponding to each of the authorized cloud sites are different from each other.

In certain embodiments, all the tokens corresponding to each of the authorized cloud sites are the same.

In certain embodiments, the client device is a mobile device.

In certain embodiments, the proxy includes a front end and a back end that can be remote from one another or integrated. The front end stores the proxy site certificate, receives the request from the client application, and authenticates with the client application. The back end authenticates with the client, requests a secure connection with the one or more cloud sites, receives the site certificate for each of the one or more cloud sites, authorizes with the one or more cloud sites, and facilitates the direct communication between the client application and the one or more cloud sites that were successfully authorized.

Figure 7:
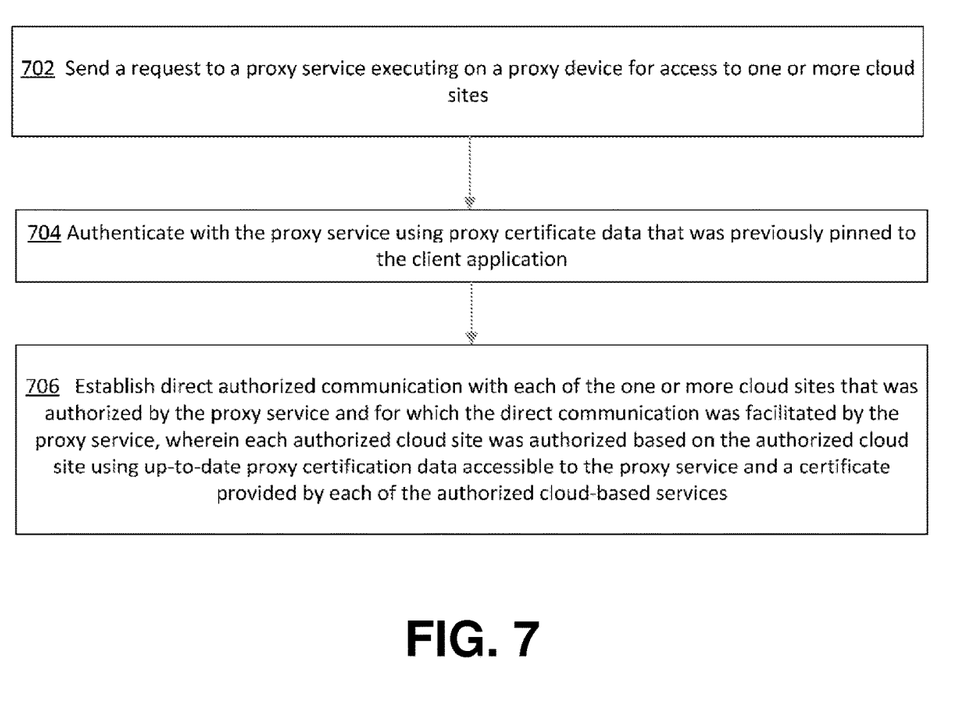
FIG. 7 is a flowchart representing an example method implemented by a client application installed on a client device that communicates with a proxy which implements centralized management of pinning certificates for cloud sites used by the client application, in accordance with embodiments of the disclosure.

FIG. 7 shows a flowchart 700 that represents a method performed by a client application installed on a client device, such as client application(s) 107 installed on client device 104, shown in FIG. 1, for providing centralized management of pinned certificates. At block 702, the client application sends a request to a proxy service executing on a proxy device for access to one or more cloud sites. At block 704, the client application authenticates with the proxy service using proxy site certificate data that was previously pinned to the client application. At block 706, the client application establishes direct authorized communication with each of the one or more cloud sites that were authorized by the proxy service and for which the direct communication was facilitated by the proxy service, wherein each authorized cloud site was authorized based on the authorized cloud site using up-to-date proxy certification data accessible to the proxy service and a site certificate provided by each of the authorized cloud-based services.

In certain embodiments, the second tokens corresponding to a subset of the authorized cloud sites are different from each other and the first tokens received from the proxy service in association with the subset of authorized cloud-based service(s) are different from each other.

In certain embodiments, all the second tokens corresponding to each of the authorized cloud sites are the same, and all the first tokens received from the proxy service in association with each of the authorized cloud sites are the same.

In certain embodiments, the client device is a mobile device.

Figure 8:
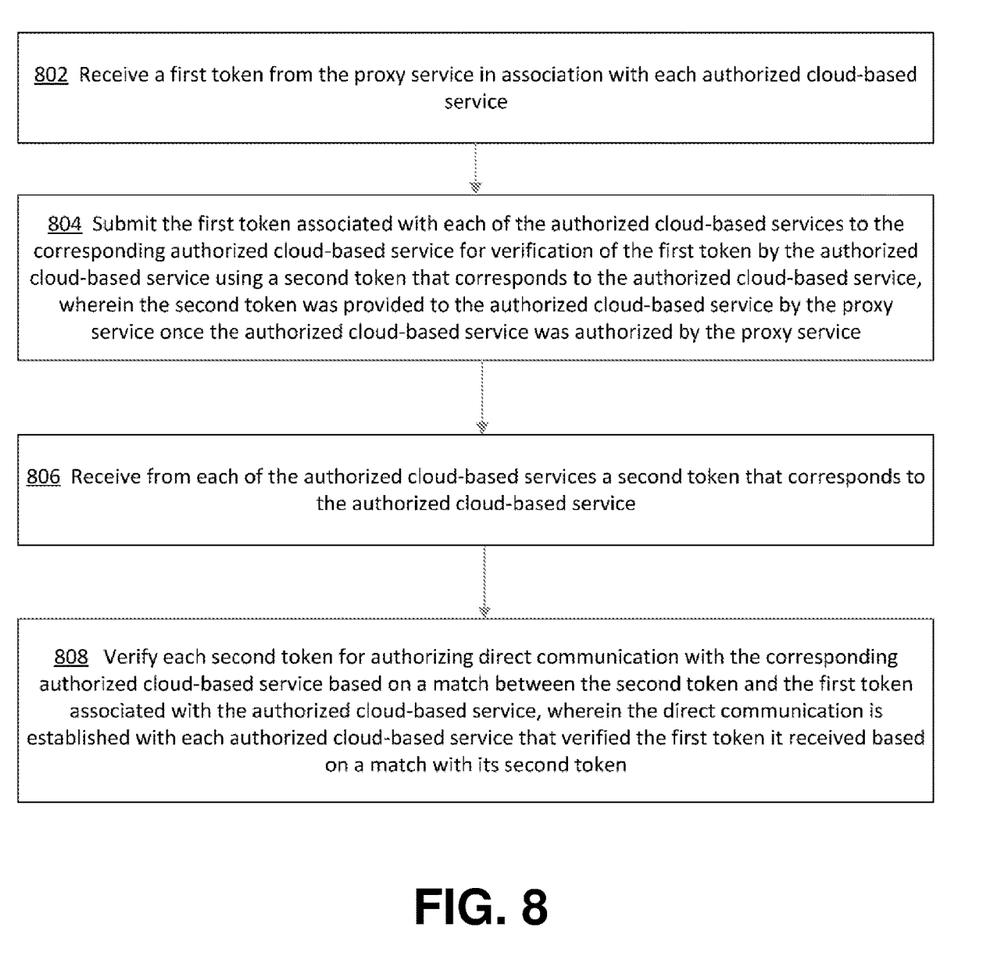
FIG. 8 is a flowchart representing different example methods, in accordance with certain embodiments, for performing facilitation of secure communication included in the example method represented by the flowchart in FIG. 7.

FIG. 8 shows a flowchart 800 that represents a method performed by a client device executing a client application (such as client device 104 and the requesting client application shown in FIG. 1). At block 802, the client application receives a first token from the proxy service in association with each authorized cloud-based service. At block 804, the client application submits the first token associated with each of the authorized cloud-based services to the corresponding authorized cloud-based service for verification of the first token by the authorized cloud-based service using a second token that corresponds to the authorized cloud based service, wherein the second token was provided to the authorized cloud-based service by the proxy service once the authorized cloud-based service was authorized by the proxy service. At block 806, the client application receives from each of the authorized cloud-based services a second token that corresponds to the authorized cloud-based service. At block 808, the client application verifies each second token for authorizing direct communication with the corresponding authorized cloud-based service based on a match between the second token and the first token associated with the authorized cloud-based service, wherein the direct communication is established with each authorized cloud-based service that verified the first token it received based on a match with its second token.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
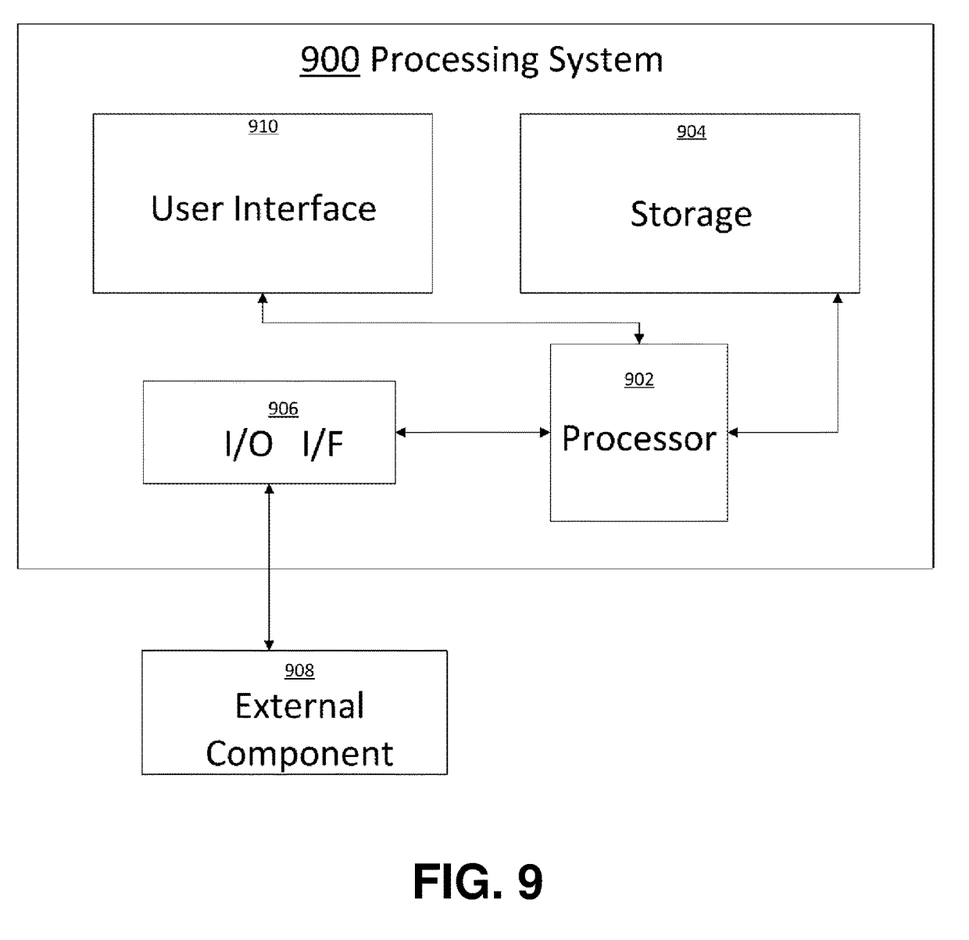
FIG. 9 is a block diagram of an exemplary computer system that could be used to implement computing devices of the system for centrally managing pinning of certificates shown in FIG. 1.

With reference to FIG. 9, a block diagram of an example processing system 900 is shown, which provides an example configuration of a computing system used by computing components of the certificate pinning management system 100 (e.g., client devices 104, proxy 102, frontend 112, backend 114, cloud sites 106 shown in FIGS. 1-3). Additionally, all or portions of the computing components of pinning management system 100 could be configured as software, and processing system 900 could represent such portions. Processing system 900 is only one example of a suitable system and is not intended to suggest any limitation as to the scope of use or functionality of embodiments of the disclosure described herein. Processing system 900 can be implemented using hardware, software, and/or firmware. Regardless, processing system 900 is capable of being implemented and/or performing functionality as set forth in the disclosure.

Processing system 900 is shown in the form of a general-purpose computing device. Processing system 900 includes a processing device 902, memory 904, an input/output (I/O) interface (I/F) 906 that can communicate with an internal component, such as a user interface 910, and optionally an external component 908.

In certain embodiments, processing device 902 can include, for example, a programmable logic device (PLD), microprocessor, digital signal processor (DSP), a microcontroller, a field programmable gate array (FPGA), an application specific integrated circuit (ASIC) and/or other discrete or integrated logic circuitry having similar processing capabilities.

In certain embodiments, processing device 902 and the memory 904 can be included in components provided in an FPGA, ASIC, microcontroller, or microprocessor, for example.

Memory 904 can include, for example, volatile and nonvolatile memory for storing data temporarily or long term, and for storing programmable instructions executable by the processing device 902. Memory 904 can be a removable (e.g., portable) memory for storage of program instructions. I/O I/F 906 can include an interface and/or conductors to couple to the one or more internal components 910 and/or external components 908.

In certain embodiments, I/O I/F 906 can be a two-wire connection of an APL edge device, the two-wire connection being configured for communicating with components of a local network of the APL edge device and for accessing a remote network.

Embodiments of the computing components of the industrial system may be implemented or executed by one or more computer systems, such as a microprocessor. Each processing system 900 can be included within the computing components of the industrial system, or multiple instances thereof.

In certain embodiments, processing system 900 is embedded in a device, such as an edge device. Portions of the processing system 900 can be provided externally, such by way of an interface.

Processing system 900 is only one example of a suitable system and is not intended to suggest any limitation as to the scope of use or functionality of embodiments of the disclosure described herein. Regardless, processing system 900 is capable of being implemented to perform any of the functionality set forth hereinabove.

Processing system 900 may be described in the general context of execution of computer system-executable instructions, such as program modules. Generally, program modules may include routines, programs, objects, components, logic, data structures, and so on that perform particular tasks or implement particular abstract data types.

Potential advantages of certificate pinning management system 100 include reduction or minimization of the number of certificates that need to be pinned to client devices 104, and centralization of management of pinning of certificates at proxy 102 for certificates associated with cloud sites needed for operation of client applications installed on client devices 104. In this way, the only pinning of certificates that would need to be managed on the client devices would be certificates from proxy 102, or potentially a few proxies. This would reduce the number of certificates for which pins would need to be managed per client device. Since a large number of client devices 104 could be affected, this greatly reduces that load of managing pinning of certificates. This reduction further simplifies the process of developing and using the client applications.

Due to the proliferation of client apps and client devices, without the centralization of management of pinning the certificates, there is a likelihood that some pinned certificates on one or more client apps on one or more client devices will be revoked or expire before the pinned certificate is updated, which can cause unwanted outages. Accordingly, the centralized management of the pinned certificates can help to avoid such outages.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s).

The various embodiments disclosed herein may be implemented as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A proxy device comprising:
   a memory configured to store a plurality of programmable instructions; and
   a processing device in communication with the memory, wherein the processing device, upon execution of the plurality of programmable instructions is configured to:
      store a proxy site certificate and up-to-date cloud site certificates for each of at least one cloud sites;
      receive a request from a client application executing on a client device to access one or more cloud sites of the at least one cloud sites, the client device being a computing device;
      authenticate with the client application using the proxy site certificate and based on the proxy site certificate being pinned to the client application;
      request a secure connection with the one or more cloud sites on behalf of the client application;
      receive, in response to the request, a site certificate for each of the one or more cloud sites;
      authorize with the one or more cloud sites on behalf of the client application using the received site certificate for each of the one or more cloud sites and the certificate data stored for each of the respective one or more cloud sites; and
      facilitate direct communication between the client application and the one or more cloud sites that were successfully authorized.

2. The proxy device of claim 1, wherein facilitating the communication comprises:
   generating a token on the condition that the authorization with the client application is successful;
   providing the token to each authorized cloud sites of the one or more cloud sites for which authorization with the cloud sites was successful; and
   providing the token to the client application,
   wherein the direct communication between the client application and each of the authorized cloud sites is established by a determination by the client application and the each of the authorized cloud sites that the token provided to the client application matches the token provided to the authorized cloud site.

3. The proxy device of claim 1, wherein facilitating the communication comprises:
   generating, on the condition that the authentication with the client application is successful, a token corresponding to each respective authorized cloud sites of the one or more cloud sites for which authorization with the cloud sites was successful on the condition that the authentication with the client application is successful;
   providing the token generated to each respective authorized cloud site; and
   providing the token provided to each respective authorized cloud site to the client application in association with the corresponding cloud site,
   wherein the direct communication between the client application and each of the authorized cloud sites is established by a determination by the client application and the each of the authorized cloud sites that the token provided to the client application in association with the authorized cloud site matches the token that corresponds to the authorized cloud site.

4. The proxy device of claim 3, wherein a subset of the tokens corresponding to each of the authorized cloud sites are different from each other.

5. The proxy device of claim 3, wherein all the tokens corresponding to each of the authorized cloud sites are the same.

6. The proxy device of claim 1, wherein the client device is a mobile device.

7. The proxy device of claim 1, wherein the proxy includes a frontend and a backend, the frontend being configured to communicate with the client device and the backend, store the proxy cite certificate, receive the request from the client application, and authenticate with the client application, the backend being configured to communicate with the plurality of cloud sites and the frontend, authenticate with the client, request a secure connection with the one or more cloud sites, receive the site certificate for each of the one or more cloud sites, authorize with the one or more cloud sites, and facilitate the direct communication between the client application and the one or more cloud sites that were successfully authorized.

8. The proxy device of claim 7, wherein the frontend is remote from the backend.

9. The proxy device of claim 7, wherein the frontend is local to the backend.

10. A client device configured to execute a client application, the client device comprising: a memory configured to store a plurality of programmable instructions; and
a processing device in communication with the memory, wherein the processing device, upon execution of the plurality of programmable instructions is configured to:
send a request to a proxy service executing on a proxy device for access to one or more cloud sites;
authenticate with the proxy service using proxy site certificate data previously pinned to the client application; and
establish direct authorized communication with each of the one or more cloud sites that was authorized by the proxy service and for which the direct communication was facilitated by the proxy service, wherein each of the authorized cloud sites was authorized based on the token using up-to-date proxy certification data accessible to the proxy service and a site certificate provided by each of the authorized cloud sites.

11. The client device of claim 10, wherein establishing direct communication comprises:
receiving a first token from the proxy service in association with each of the authorized cloud sites;
submitting the first token associated with each of the authorized cloud sites to the corresponding authorized cloud site for verification of the first token by the authorized cloud site using a second token that corresponds to the authorized cloud site, wherein the second token was provided to the authorized cloud site by the proxy service once the authorized cloud site was authorized by the proxy service;
receiving from each of the authorized cloud sites a second token that corresponds to the authorized cloud site; and
verifying each second token for authorizing direct communication with the corresponding authorized cloud site based on a match between the second token and the first token associated with the authorized cloud site, wherein the direct communication is established with each of the authorized cloud sites that verified the first token it received based on a match with its second token.

12. The client device of claim 11, wherein the second tokens corresponding to a subset of the authorized cloud sites are different from each other and the first tokens received from the proxy service in association with the subset of the authorized cloud sites are different from each other.

13. The client device of claim 11, wherein all the second tokens corresponding to each of the authorized cloud sites are the same and all the first tokens received from the proxy service in association with each of the authorized cloud sites are the same.

14. The client device of claim 10, wherein the client device is a mobile device.

15. A method comprising:
storing a proxy site certificate and up-to-date cloud site certificates for each of at least one cloud sites;
receiving a request from a client application executing on a client device to access one or more cloud sites of the at least one cloud sites, the client device being a computing device;
authenticating with the client application using the proxy site certificate and based on the proxy site certificate being pinned to the client application;
requesting a secure connection with the one or more cloud sites on behalf of the client application;
receiving, in response to the request, a site certificate for each of the one or more cloud sites;
authorizing with the one or more cloud sites on behalf of the client application using the received site certificate for each of the one or more cloud sites and the certificate data stored for each of the respective one or more cloud sites; and
facilitating direct communication between the client application and the one or more cloud sites that were successfully authorized.

16. The method of claim 15, wherein facilitating the communication comprises:
generating a token on the condition that the authorization with the client application is successful;
providing the token to each authorized cloud sites of the one or more cloud sites for which authorization with the cloud sites was successful; and
providing the token to the client application,
wherein the direct communication between the client application and each of the authorized cloud sites is established by a determination by the client application and the each of the authorized cloud sites that the token provided to the client application matches the token provided to the authorized cloud site.

17. The method of claim 15, wherein facilitating the communication comprises:
generating, on the condition that the authentication with the client application is successful, a token corresponding to each respective authorized cloud sites of the one or more cloud sites for which authorization with the cloud sites was successful on the condition that the authentication with the client application is successful;
providing the token generated to each respective authorized cloud site; and
providing the token provided to each respective authorized cloud site to the client application in association with the corresponding cloud site,
wherein the direct communication between the client application and each of the authorized cloud sites is established by a determination by the client application and the each of the authorized cloud sites that the token provided to the client application in association with the authorized cloud site matches the token that corresponds to the authorized cloud site.

18. A method of executing a client application, the method comprising:
sending a request to a proxy service executing on a proxy device for access to one or more cloud sites;

authenticating with the proxy service using proxy site certificate data previously pinned to the client application; and establishing direct authorized communication with each of the one or more cloud sites that was authorized by the proxy service and for which the direct communication was facilitated by the proxy service, wherein each authorized cloud site was authorized based on the token using up-to-date proxy certification data accessible to the proxy service and a site certificate provided by each of the authorized cloud sites.

19. The method of claim 18, wherein establishing direct communication comprises:

receiving a first token from the proxy service in association with each of the authorized cloud sites;

submitting the first token associated with each of the authorized cloud sites to the corresponding authorized cloud site for verification of the first token by the authorized cloud site using a second token that corresponds to the authorized cloud site, wherein the second token was provided to the authorized cloud site by the proxy service once the authorized cloud site was authorized by the proxy service;

receiving from each of the authorized cloud sites a second token that corresponds to the authorized cloud site; and verifying each second token for authorizing direct communication with the corresponding authorized cloud site based on a match between the second token and the first token associated with the authorized cloud site, wherein the direct communication is established with each of the authorized cloud sites that verified the first token it received based on a match with its second token.

\* \* \* \* \*